United States Patent
Ueda

(10) Patent No.: US 10,382,676 B2
(45) Date of Patent: Aug. 13, 2019

(54) IMAGE DISPLAY APPARATUS, IMAGE CAPTURING APPARATUS, IMAGE DISPLAY METHOD, AND STORAGE MEDIUM

(71) Applicant: CANON KABUSHIKI KAISHA, Tokyo (JP)

(72) Inventor: Hitomi Ueda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/800,566

(22) Filed: Nov. 1, 2017

(65) Prior Publication Data

US 2018/0070017 A1    Mar. 8, 2018

Related U.S. Application Data

(63) Continuation of application No. 15/056,797, filed on Feb. 29, 2016, now Pat. No. 9,832,376.

(30) Foreign Application Priority Data

Mar. 3, 2015    (JP) .................................. 2015-041775

(51) Int. Cl.
    *H04N 5/232*    (2006.01)
    *G06T 7/557*    (2017.01)
    (Continued)

(52) U.S. Cl.
    CPC .......... *H04N 5/23229* (2013.01); *G06T 7/557* (2017.01); *H04N 5/23212* (2013.01);
    (Continued)

(58) Field of Classification Search
    CPC ........... G06K 15/1828; G06K 15/1802; G06K 15/1827; G06K 15/1809; G06K 15/1801; G06K 15/402; G06K 2215/0022
    See application file for complete search history.

(56) References Cited

U.S. PATENT DOCUMENTS 7,956,895 B2    6/2011    Kojima
9,681,042 B2    6/2017    Hiasa et al.
(Continued)

FOREIGN PATENT DOCUMENTS

JP    2004-120165 A    4/2004
JP    2008-124963 A    5/2008
(Continued)

OTHER PUBLICATIONS

The above foreign patent documents were cited in the Jan. 16, 2018 Japanese Office Action, which is enclosed without an English Translation, that issued in Japanese Patent Application No. 2015041775.
(Continued)

*Primary Examiner* — Hung H Lam
(74) *Attorney, Agent, or Firm* — Cowan, Liebowitz & Latman, P.C.

(57) ABSTRACT

An image display apparatus includes an acquisition unit configured to acquire an image file that includes reconstructable image data that includes information corresponding to a light field, a display unit configured to display the image data included in the image file acquired by the acquisition unit as an image, and a control unit configured to control the display unit so as to display an image and perform display for informing a user that the image file corresponding to the image is a reconstructable image file.

18 Claims, 12 Drawing Sheets

(51) Int. Cl.
*H04N 13/282* (2018.01)
*H04N 13/232* (2018.01)
*H04N 13/00* (2018.01)
*H04N 13/229* (2018.01)
*H04N 13/218* (2018.01)

(52) U.S. Cl.
CPC ....... *H04N 5/23293* (2013.01); *H04N 13/232* (2018.05); *H04N 13/282* (2018.05); *G06T 2207/10052* (2013.01); *H04N 13/218* (2018.05); *H04N 13/229* (2018.05); *H04N 2013/0081* (2013.01)

(56) References Cited

U.S. PATENT DOCUMENTS

| | | |
|---|---|---|
| 2008/0131019 A1 | 6/2008 | Ng |
| 2010/0265385 A1 | 10/2010 | Knight et al. |
| 2011/0267482 A1 | 11/2011 | Wetzstein et al. |
| 2011/0298961 A1 | 12/2011 | Yoshida |
| 2013/0076930 A1 | 3/2013 | Border et al. |
| 2013/0076966 A1 | 3/2013 | Border et al. |
| 2013/0329068 A1 | 12/2013 | Hamanaka et al. |
| 2013/0329124 A1 | 12/2013 | Nagamatsu |
| 2014/0071305 A1 | 3/2014 | Hiasa et al. |
| 2014/0219576 A1 | 8/2014 | Yokoyama |
| 2015/0234865 A1 | 8/2015 | Iida |
| 2015/0264268 A1 | 9/2015 | Aiba |
| 2015/0310613 A1 | 10/2015 | Murakami |
| 2016/0044228 A1* | 2/2016 | Kim ..................... H04N 5/2258 348/345 |
| 2016/0080645 A1 | 3/2016 | Ohba et al. |
| 2016/0127636 A1* | 5/2016 | Ito ....................... G06F 3/04845 348/333.12 |
| 2016/0142615 A1 | 5/2016 | Liang et al. |
| 2016/0191910 A1* | 6/2016 | von und zu Liechtenstein ........... H04N 13/279 348/43 |
| 2016/0381282 A1* | 12/2016 | Bandlamudi ...... H04N 5/23212 348/240.3 |
| 2017/0034421 A1 | 2/2017 | Yamazaki et al. |
| 2017/0085858 A1 | 3/2017 | Kitago |

FOREIGN PATENT DOCUMENTS

| | | |
|---|---|---|
| JP | 2014-150506 A | 8/2014 |
| JP | 2014-158258 A | 8/2014 |
| JP | 2014-220598 A | 11/2014 |

OTHER PUBLICATIONS

The above foreign patent document was cited in the Mar. 29, 2019 Japanese Office Action, without an English Translation, that issued in Japanese Patent Application No. 2015041775.

* cited by examiner

FIG. 8
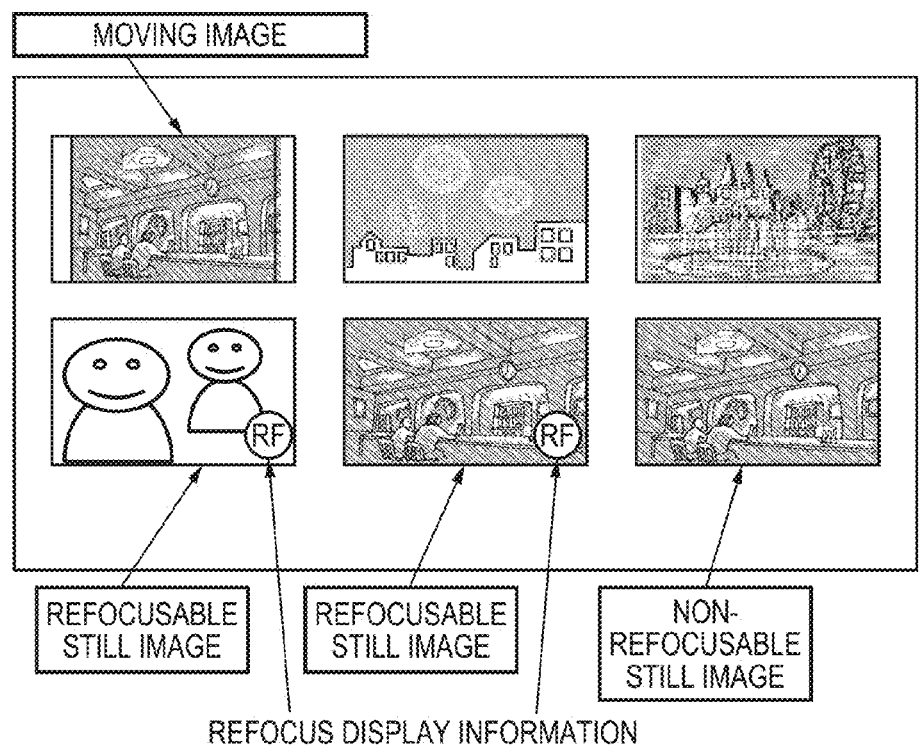
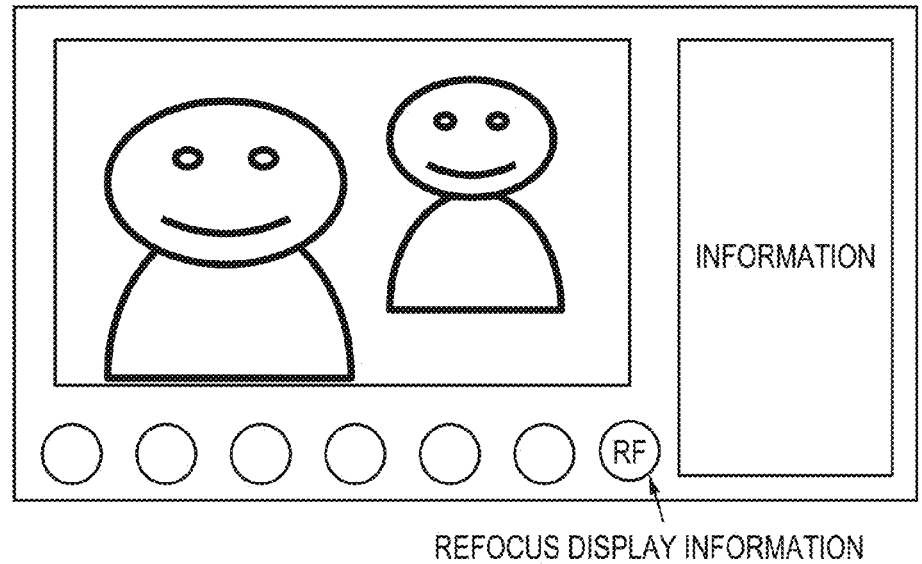

IMAGE DISPLAY APPARATUS, IMAGE CAPTURING APPARATUS, IMAGE DISPLAY METHOD, AND STORAGE MEDIUM

CROSS-REFERENCE TO RELATED APPLICATION

This application is a continuation of application Ser. No. 15/056,797, filed Feb. 29, 2016, the entire disclosure of which is hereby incorporated by reference.

BACKGROUND OF THE INVENTION

Field of the Invention

The present invention relates to a technique for displaying reconstructable image data.

Description of the Related Art

Until now, in the case where an image is captured with wrong focus adjustment of a camera, it has been necessary to redo focus adjustment and recapture the image. Also, in the case where an image including a plurality of subjects having different depths is obtained with each of the subjects in focus, it has been necessary to perform capturing with each subject in focus multiple times and composite a plurality of the obtained images. However, in recent years, a technique known as light field photography, according to which it is possible to acquire an image from multiple view points by adding a new optical element to the optical system, and later adjust a focus position (refocus) by image processing, has been developed.

Focus adjustment can be performed after capturing with the technique, and therefore the technique is advantageous in that failure in focus adjustment at the time of capturing can be corrected with image processing. Furthermore, the technique is advantageous in that a plurality of images in which any subject in the image is in focus can be obtained from one captured image by changing an image processing method, which reduces the number of instances of capturing.

In light field photography, directions and intensities (light field) of rays passing through a plurality of positions in a space are calculated from data obtained by capturing images from multiple view points. An image obtained in the case of being formed on a virtual sensor after passing through a virtual optical system is calculated using information on the obtained light field. By setting this kind of virtual optical system and sensor as appropriate, the above-described refocus is also possible.

As an image capturing apparatus for acquiring the light field, a Plenoptic camera in which a microlens array is placed behind a main lens and a camera array in which small cameras are arranged are known. With both image capturing apparatuses, multi-viewpoint image data obtained by capturing images of subjects in different directions can be obtained through one capture. That is, it can also be said that the light field photography is calculating an image to be acquired by a virtual sensor from multi-viewpoint image data under virtual optical conditions. Note that processing for calculating an image acquired by the virtual sensor is referred to as "reconstruction processing", and in "reconstruction processing", processing for changing a focus position is referred to as "refocus processing" in particular, hereinafter. As the refocus processing, a method of performing projective transformation on the acquired multi-viewpoint image data, on the virtual sensor, adding the resulting data together, and averaging the added data is known (see Japanese Patent Laid-Open No. 2014-158258).

Methods disclosed in Japanese Paten Laid-Open No. 2014-158258 and US Patent Application Publication No. 2008-0131019, for example, are examples of a method for displaying an image (refocus image hereinafter) that has been subjected to refocus processing while a focus position is changed. The method of Japanese Patent Laid-Open No. 2014-158258 discloses a method of showing a user whether or not a subject is included in a range in which the focus position can be adjusted, on a screen on which the refocus image is displayed. Also, the method of US Patent Application Publication No. 2008-0131019 discloses a method in which a user specifies a subject to be in focus through a screen on which a refocus image is displayed, and a refocus image in which the subject is in focus is displayed on the screen.

However, with the above-described conventional techniques disclosed in Japanese Patent Laid-Open No. 2014-158258 and US Patent Application Publication No. 2008-0131019, it is not possible to know whether or not a subject is a refocusable subject unless the user specifies the subject to be in focus. When an image is displayed in a camera, there are various types of data such as non-refocusable still images, refocusable still images and moving images, and other data. In particular, a refocusable still image and a non-refocusable still image cannot be distinguished from each other because these still images are displayed similarly as still images.

SUMMARY OF THE INVENTION

The present invention has been made in view of the above-described issues, and when image data for display is generated from an image file from which an image can be reconstructed, enables the image file to be displayed such that a user can easily know that the image file is a reconstructable file.

According to a first aspect of the present invention, there is provided an image display apparatus comprising: an acquisition unit configured to acquire an image file that includes reconstructable image data that includes information corresponding to a light field; a display unit configured to display the image data included in the image file acquired by the acquisition unit as an image; and a control unit configured to control the display unit so as to display the image and perform display for informing a user that the image file corresponding to the image is a reconstructable image file.

According to a second aspect of the present invention, there is provided an image display apparatus comprising: an acquisition unit configured to acquire an image file that includes reconstructable image data that includes information corresponding to a light field; a display unit configured to display the image data included in the image file acquired by the acquisition unit as an image; and a control unit configured to perform control such that an image corresponding to non-reconstructable image data and an image corresponding to the reconstructable image data are displayed in different display modes on the display unit.

According to a third aspect of the present invention, there is provided an image capturing apparatus comprising: an image display apparatus including an acquisition unit configured to acquire an image file that includes reconstructable image data that includes information corresponding to a light field, a display unit configured to display the image data included in the image file acquired by the acquisition unit as an image, and a control unit configured to control the display unit so as to display the image and perform display for informing a user that the image file corresponding to the image is a reconstructable image file; and an image capturing element in which unit pixels that each include a plurality of photoelectric converting elements with respect to one microlens are arranged in a matrix.

According to a fourth aspect of the present invention, there is provided an image capturing apparatus comprising: an image display apparatus including an acquisition unit configured to acquire an image file that includes reconstructable image data that includes information corresponding to a light field, a display unit configured to display the image data included in the image file acquired by the acquisition unit as an image, and a control unit configured to perform control such that an image corresponding to non-reconstructable image data and an image corresponding to the reconstructable image data are displayed in different display modes on the display unit; and an image capturing element in which unit pixels that each include a plurality of photoelectric converting elements with respect to one microlens are arranged in a matrix.

According to a fifth aspect of the present invention, there is provided an image display method comprising: acquiring an image file that includes reconstructable image data that includes information corresponding to a light field; displaying the image data included in the image file acquired in the acquiring as an image, and controlling the displaying such that the image is displayed in the displaying and display for informing a user that the image file corresponding to the image is a reconstructable image file is performed.

According to a sixth aspect of the present invention, there is provided an image display method comprising: acquiring an image file that includes reconstructable image data that includes information corresponding to a light field; displaying the image data included in the image file acquired in the acquiring as an image, and performing control such that an image corresponding to non-reconstructable image data and an image corresponding to the reconstructable image data are displayed in different display modes in the displaying.

Further features of the present invention will become apparent from the following description of exemplary embodiments with reference to the attached drawings.

BRIEF DESCRIPTION OF THE DRAWINGS

FIG. 8 is a diagram showing a display method according to the first embodiment.

DESCRIPTION OF THE EMBODIMENTS

Hereinafter, embodiments of the present invention will be described in detail with reference to the attached drawings. First, a configuration that is shared in the embodiments of the present invention will be described with reference to FIGS. 1 to 4.

Figure 1:
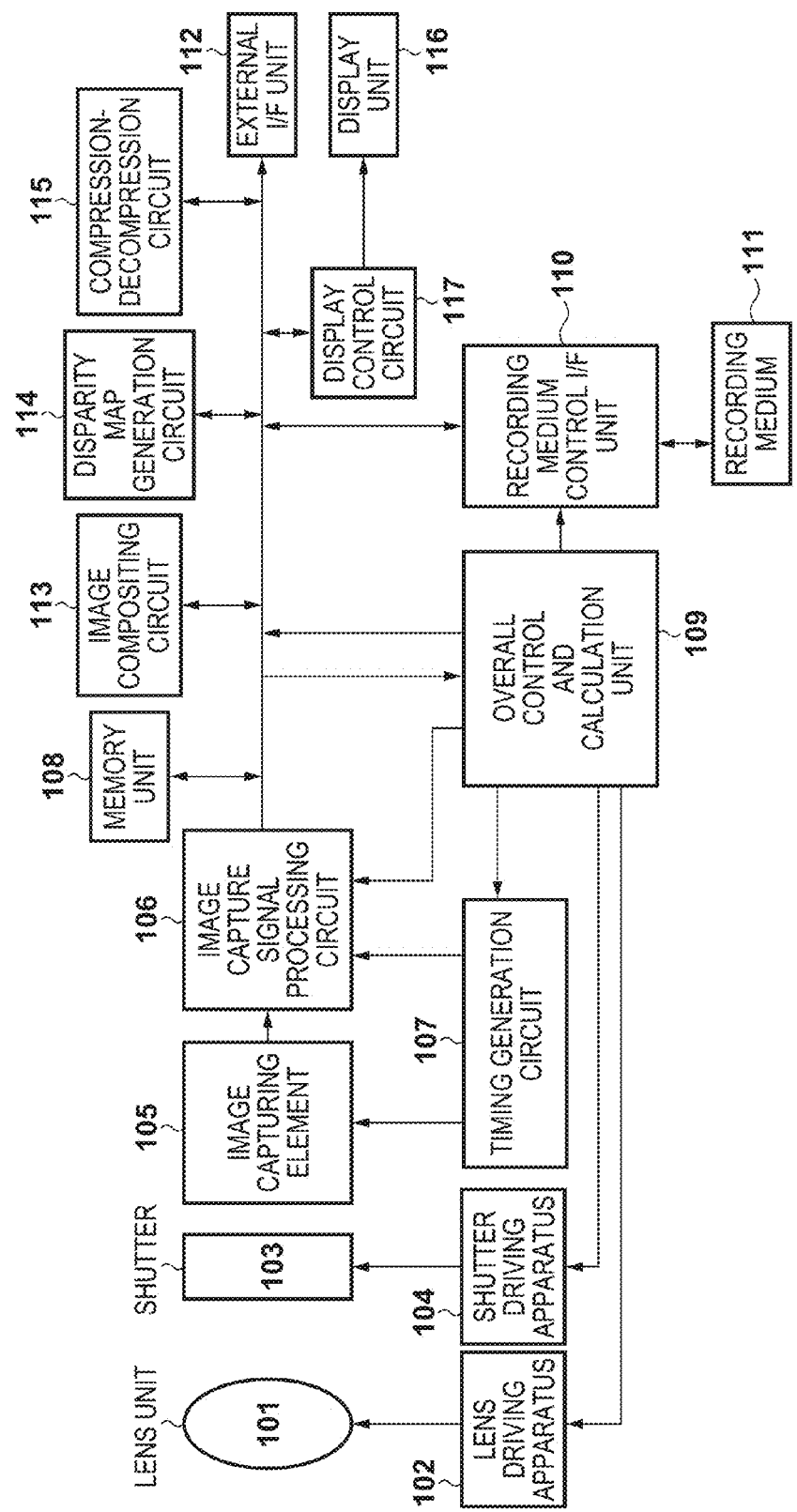
FIG. 1 is a block diagram of a digital camera, which is an embodiment of an image display apparatus according to the present invention.

FIG. 1 is a block diagram showing the configuration of a digital camera 100 (image capturing apparatus), which is an embodiment of an image display apparatus according to the present invention. In FIG. 1, reference numeral 101 indicates a lens unit that forms an optical image of a subject on an image capturing element 105, and zoom control, focus control, diaphragm control and the like are performed by a lens driving apparatus 102. Reference numeral 103 indicates a mechanical shutter that is driven by a shutter driving apparatus 104. Reference numeral 105 indicates an image capturing element for obtaining the subject image formed by the lens unit 101 as an image signal, and reference numeral 106 indicates an image capture signal processing circuit that performs various corrections, predetermined image interpolation processing, and color conversion processing on the image signal output from the image capturing element 105.

Reference numeral 107 indicates a timing generation circuit that outputs various timing signals to the image capturing element 105 and the image capture signal processing circuit 106, and reference numeral 109 indicates an overall control and calculation unit that controls various calculations and the entire image capturing apparatus. Reference numeral 108 indicates a memory that stores data for displaying image information and indicates a memory for temporarily storing image data, and reference numeral 110 indicates a recording medium control interface unit (I/F unit) for performing recording on or reading from a recording medium. Reference numeral 111 indicates a detachable recording medium such as a semiconductor memory for recording or reading image data, and reference numeral 112 indicates an external interface unit (external unit I/F unit) for a user performing operations on a digital camera.

Reference numeral 115 indicates a compression-decompression circuit that has a function of compressing stored image data into JPEG data, for example, in accordance with a predetermined image compression method (adaptive discrete cosine transformation (ADCT) or the like, for example), and writing the compressed image data in the memory unit 108, and a function of decompressing the image data that has been read out from the memory unit 108 and writing the decompressed image data in the memory unit 108.

Reference numeral 116 indicates a display unit that displays various types of information and a captured image, and reference numeral 117 indicates a display control circuit for controlling the display unit 116. With the display control circuit 117, display control for displaying image data as a flat image, which will be described later, and display control for displaying image data as a three-dimensional image. Reference numeral 113 indicates an image compositing circuit and composites a signal of a left eye image and a signal of a right eye image generated by an image capturing element, which will be described later. Reference numeral 114 indicates a disparity map generation circuit, and generates disparity map using the left eye image and the right eye image.

Figure 2:
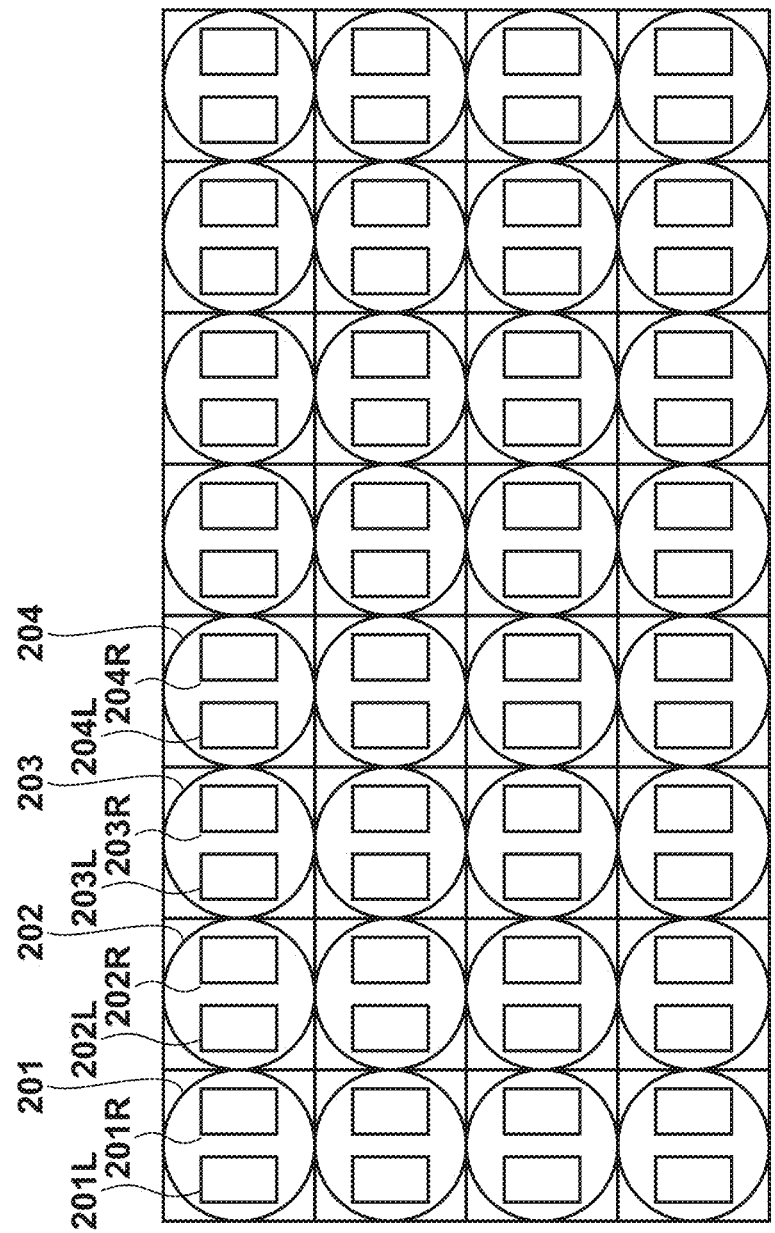
FIG. 2 is a diagram schematically showing a pixel array of an image capturing element.

FIG. 2 is a diagram showing an arrangement of pixels of the image capturing element 105. Although a range including 4 vertical pixels×8 horizontal pixels is shown herein in order to simplify description, in actuality, the image capturing element is configured such that a larger number of pixels are arranged in a matrix similar thereto. As shown in FIG. 2, one microlens and two photodiodes (201L, 201R to 204L, 204R . . . ), which are photoelectric converting elements, are arranged in each unit pixel (reference numerals 201 to 204 . . . , for example) of the image capturing element 105. The unit pixels are configured such that image signals having different view points can be acquired in the unit pixels. That is, the image capturing element 105 shown in FIG. 2 can acquire light field data.

Next, operations performed in the image capturing apparatus having the above-described configuration at the time of capturing will be described. When a release button (not shown) of the external I/F unit 112 is pressed, focus detection calculation is performed based on data from the image capturing element, and a defocus amount of a subject is calculated by the overall control and calculation unit 109 based on the focus detection results. Thereafter, the lens unit is driven by the lens driving apparatus 102 and it is determined whether or not the subject is in focus, and if it is determined that the subject is not in focus, the lens unit is driven again and focus detection is performed. The focus detection calculation may be performed with a dedicated apparatus for focus detection (not shown) instead of obtaining the calculation using data from the image capturing element. After it is confirmed that the subject is in focus, an image capturing operation is started. When the image capturing operation ends, the image signal output from the image capturing element 105 is subjected to image processing in the image capture signal processing circuit 106, and is written in the memory unit 108 by the overall control and calculation unit 109.

All of image signals from the photodiodes (PDs) are output from the image capturing element 105. Taking FIG. 2 as an example, the image signals are output from all of the PDs in the following order: 201L, 201R, 202L, 202R, 203L, 203R, 204L, 204R, . . . . In the image capture signal processing circuit 106, the image data that has been read out from the image capturing element 105 is divided into left eye image data and right eye image data and the divided data is subjected to image processing. The left eye image is an image obtained by selectively processing only the outputs of the left PDs, namely, 201L, 202L, 203L, 204L, . . . in FIG. 2. Also, the right eye image is an image obtained by selectively processing only the outputs of the right PDs, namely, 201R, 202R, 203R, 204R, . . . in FIG. 2. The left eye image and the right eye image are held separately in the memory unit 108.

A composite image (main image) is generated by the image compositing circuit 113 using the left eye image and the right eye image accumulated in the memory unit 108. The generated composite image and the left eye image or the right eye image are accumulated in the memory unit 108. The image processing executed by the image compositing circuit 113 is processing for obtaining the arithmetic mean value per pixel of the left eye image and the right eye image. Even if the shape of a subject in the left eye image and the shape of the subject in the right eye image are different from each other in the image data that has been read out from the image capturing element 105, the shapes of the subject are interpolated by the processing performed by the image compositing circuit, and image data having a correct shape is generated.

Next, a disparity map is generated in the disparity map generation circuit 114, and the obtained disparity map is accumulated in the memory unit 108. The disparity map is generated in the disparity map generation circuit 114 using the left eye image and the right eye image so as to obtain a disparity amount. The disparity amount can be detected by detecting subjects included in a left eye image (201L) and a right eye image (201R) and obtaining a shift amount of the subjects. The left eye image data, the right eye image data, the composite image data generated by the image compositing circuit 113, and the disparity map generated by the disparity map generation circuit 114 are accumulated in the memory unit 108.

The composite image data and the right eye image data or the left eye image data are recorded in a detachable recording medium 111 such as a semiconductor memory through the recording medium control I/F unit 110, by the control of the overall control and calculation unit 109. Also, an image may be processed by directly performing input on a computer through the external I/F unit 112.

Figure 3:
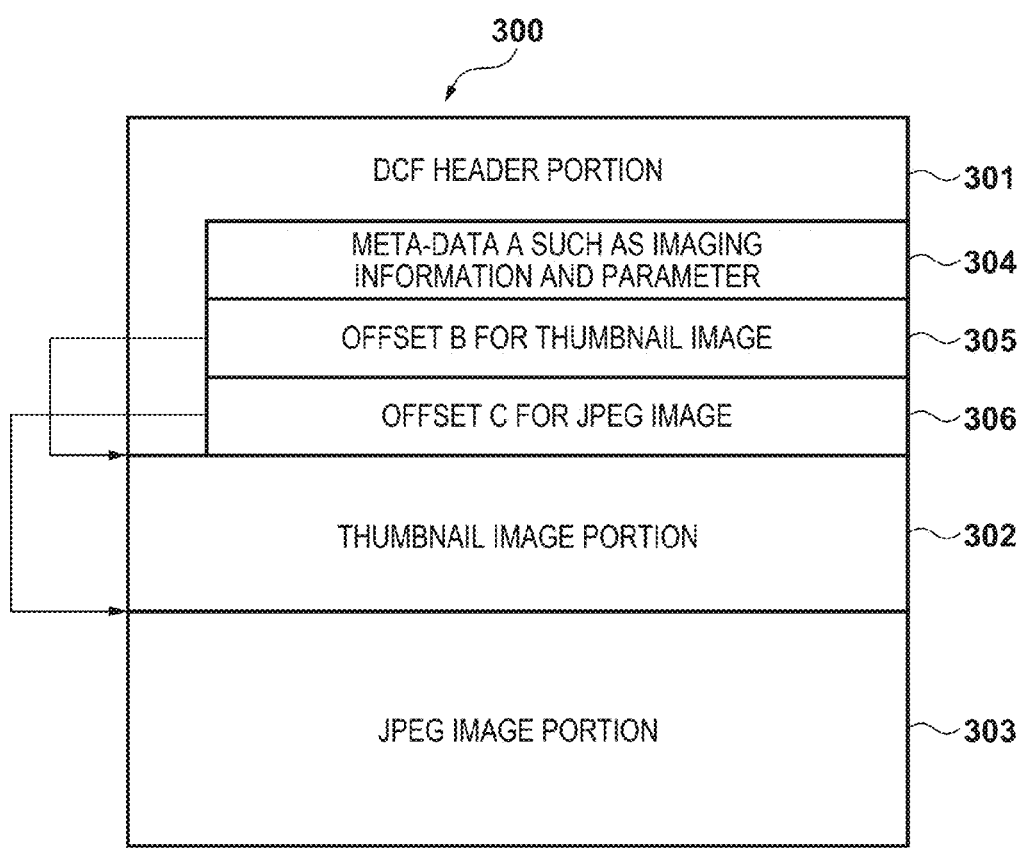
FIG. 3 is a diagram showing a structure of a general DCF image file.

FIG. 3 is a diagram showing a structure of a general DCF image file. Currently, a DCF image file 300 can be output with most of digital cameras, and includes a DCF header portion 301, a thumbnail image portion 302, and a JPEG image portion 303. The DCF header portion 301 is a region storing DCF header information and has a predetermined data size. The DCF header information includes meta-information A (304) such as imaging information and parameters relating to image data stored in the JPEG image portion 303, and also includes an offset value B (305) for a thumbnail image and an offset C (306) for a JPEG image. Starting positions of the image data are specified by the offset values B and C. The thumbnail image portion 302 is a region in which thumbnail images resized by thinning JPEG images stored in the JPEG image portion 303 are stored in order to be used when index display of a plurality of images is performed on the display unit 116. The JPEG image portion 303 is a region for storing JPEG images obtained by compression in the compression-decompression circuit 115 after image processing in the image capture signal processing circuit 106, and the JPEG image portion 303 is data that can be handled by many general applications.

Figure 4:
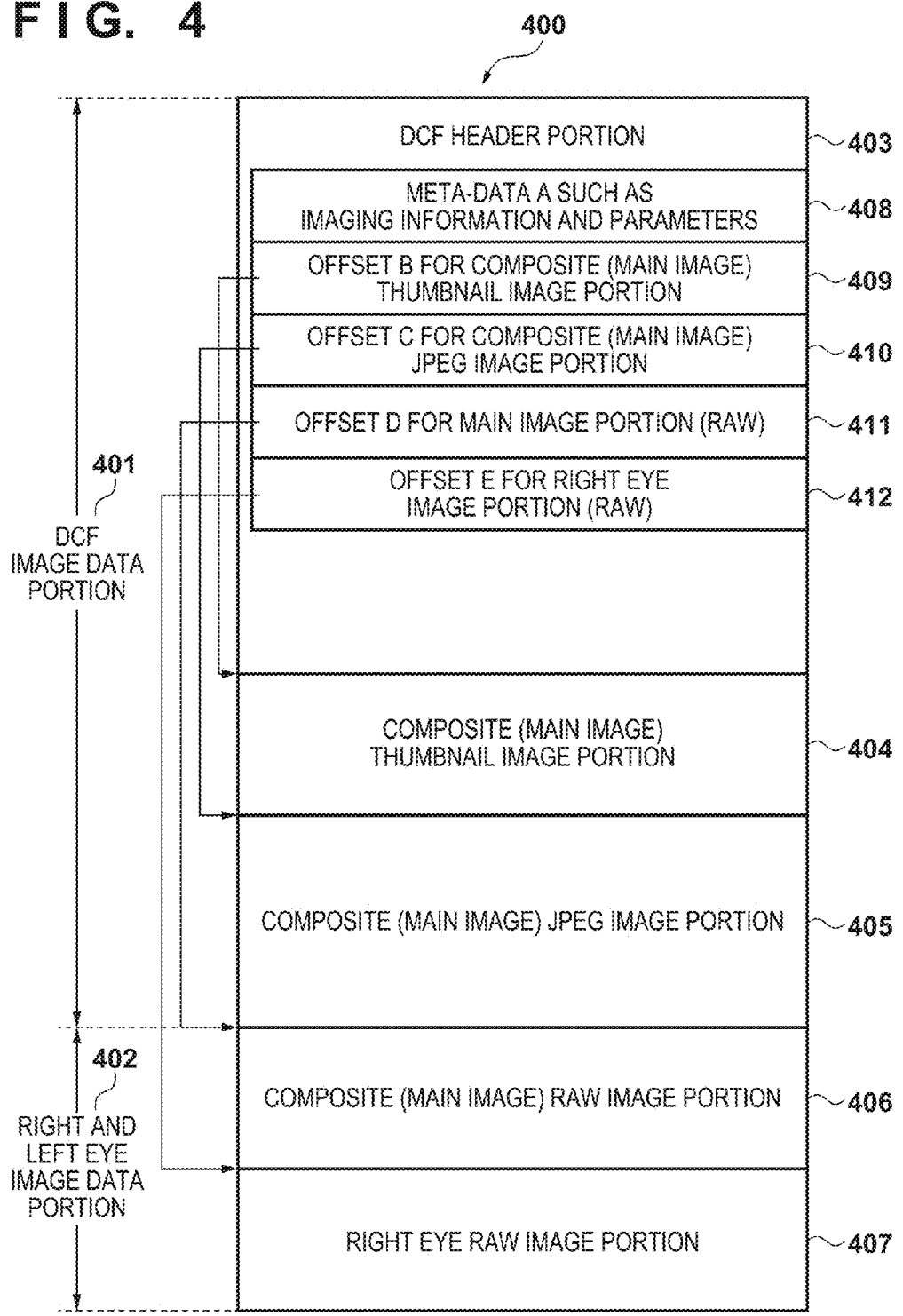
FIG. 4 is a diagram schematically showing the structure of an image file, which is the target of the embodiment of the present invention.

FIG. 4 shows an example of the structure of a three-dimensional image file of right eye and left eye images in the case where a DCF image file including left eye image data and right eye image data (reconstructable image data that includes information corresponding to a light field) that corresponds to the present embodiment is generated. The DCF image data portion 401 of the three-dimensional image file 400 of right eye and left eye images is configured by a DCF header portion 403, a composite thumbnail image portion 404, and a composite JPEG image portion 405. The DCF header portion 403 is a region in which DCF header information is stored and has a predetermined data size. The DCF header information includes meta-data A (408) such as imaging information and parameters relating to image data stored in the composite JPEG image portion 405, and also includes an offset B (409) for the composite (main image) thumbnail image portion, an offset C (410) for the composite (main image) JPEG image portion, an offset D (411) for a main image portion (RAW), and an offset E (412) for a right eye (RAW) image portion. Starting positions of the data are specified by the offset values B, C, D, and E. The composite thumbnail image portion 404 is a region in which composite thumbnail images resized by thinning composite JPEG images stored in the composite JPEG image portion 405 are stored in order to be used when index display of a plurality of the images is performed or the image display unit 412. The composite JPEG image portion 405 is a region for storing composite JPEG images obtained by compressing image data from the image capturing element 105 in the compression decompression unit 115 after image processing in the image capture signal processing circuit 106. The image data is data that can be handled by many general applications, and the present embodiment, the JPEG image obtained by the right eye image and the left eye image being composited by the image compositing circuit 113 is stored. As a result of compositing right and left images, the composite JPEG image 405 becomes an image that can be normally reproduced as a flat image. The RAW image obtained by the right eye image and the left eye image being composited by the image compositing circuit 113 is stored in the composite RAW image portion 406. The RAW data or the right eye image is stored in a right eye RAW image portion. In the present embodiment, left eye RAW image data can be created using meta-data based on the composite RAW image data and the right eye RAW image data. Instead of storing all data on the composite image, the right eye image, and the left eye image, storing the composite image data and the right eye image data (or left eye image data) in a RAW format (format in which data can be inversely transformed) makes it easy to perform processing thereafter, thereby improving user-friendliness.

First Embodiment

Hereinafter, processing for reproducing an image file in the image capturing apparatus configured as described above will be described with reference to FIG. 5.

In step S501, an image reproduction button (not shown) of the external I/F unit 112 is pressed, and it is determined whether or not an instruction to start image reproduction has been given. If the instruction to start image reproduction has not been given, this processing just ends. If the instruction to start image reproduction has been given, it is determined in step S502 whether or not there is a displayable image file in the recording medium 111. If it is determined that there is a displayable image file, in step S503, image file loading processing in which the image file is read out from the recording medium 111 to the memory unit 108 via the recording medium control I/F unit 110 is performed. Next, an extension is analyzed in step S504, and it is determined in step S505 whether the image file is moving image data or still image data. If it is determined that the image file is not moving image data, the processing advances to step S506.

Image file analysis processing in which the data that has been loaded to the memory unit 108 in step S503 is analyzed is performed in step S506. In this file analysis processing, analyzing the structure of the DCF image file described in FIG. 4 makes it possible to access the image data. Next, in step S507, based on the analysis in step S506, it is determined whether or not the image file is a refocusable image file with a focus position that can be changed by image processing later. Here, "determining whether the image file is a refocusable image file" means "determining whether the image file is an image file with which images for multiple view points and a composite image thereof can be prepared". Moreover, in the present embodiment, it is determined that the image file is a refocus image recorded with an image file structure in which the composite image data and the right eye image data described in FIG. 4 are recorded. Here, if it is determined that the image file is a refocusable image, the processing advances to step S508.

Figure 7:
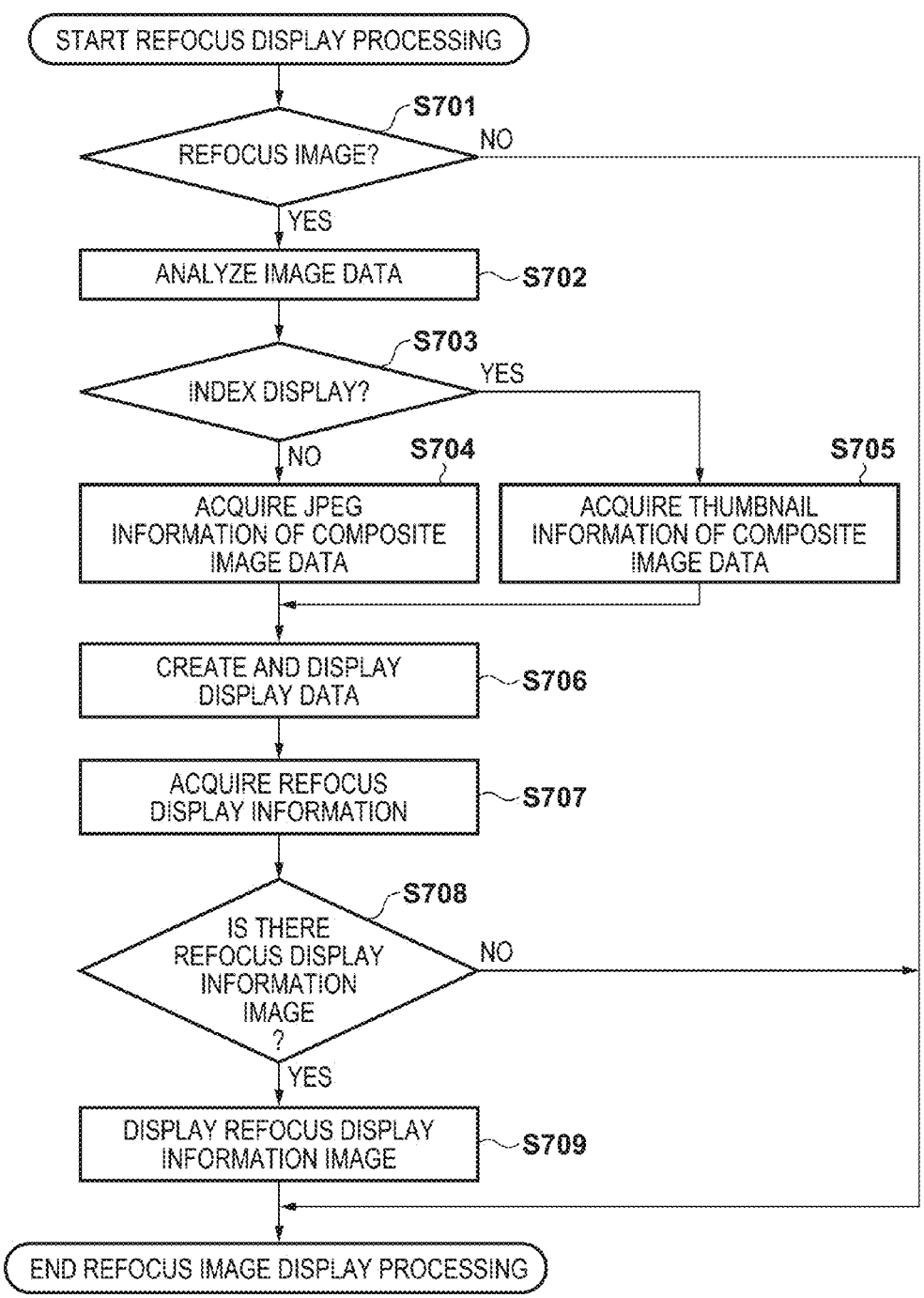
FIG. 7 is a flowchart showing refocus display processing according to the first embodiment.

In step S508, reproduction processing for refocus, which will be as described later using FIG. 7, is performed based on the refocusable image data. The processing then advances to step S510, and display processing is performed with the display data of the image data that was determined in step S505 as the moving image file and the image data that was determined in step S507 as a non-refocusable image. Note that in the case where it is determined in step S505 that the image file is moving image data, the processing advances to step S509, an image for display is created from the moving image, and the processing advances to step S510.

In the case where it is determined in step S511 that there is the subsequent file, the processing returns to step S502 and the reproduction processing continues. In the case where it is determined in step S511 that there is no subsequent file, the display processing ends.

In the present embodiment, performing the processing for reproducing an image file as described above makes it possible to distinguish image files that are compatible with refocusing from other files and perform reproduction processing, and to inform a user that the image file is the refocusable image file.

Next, reproduction modes will be described with reference to FIG. 6. A display mode 601 indicates a mode in which a plurality of images are displayed on the display unit 116 simultaneously. In this case, the refocusable image data, non-refocusable image data, and moving image data shown in FIG. 4 are displayed at the same size and are subjected to index display. A display mode 602 indicates a mode in the case where only image data is reproduced. A display mode 603 indicates a mode in which information on an image is reproduced together with the image data.

Figure 5:
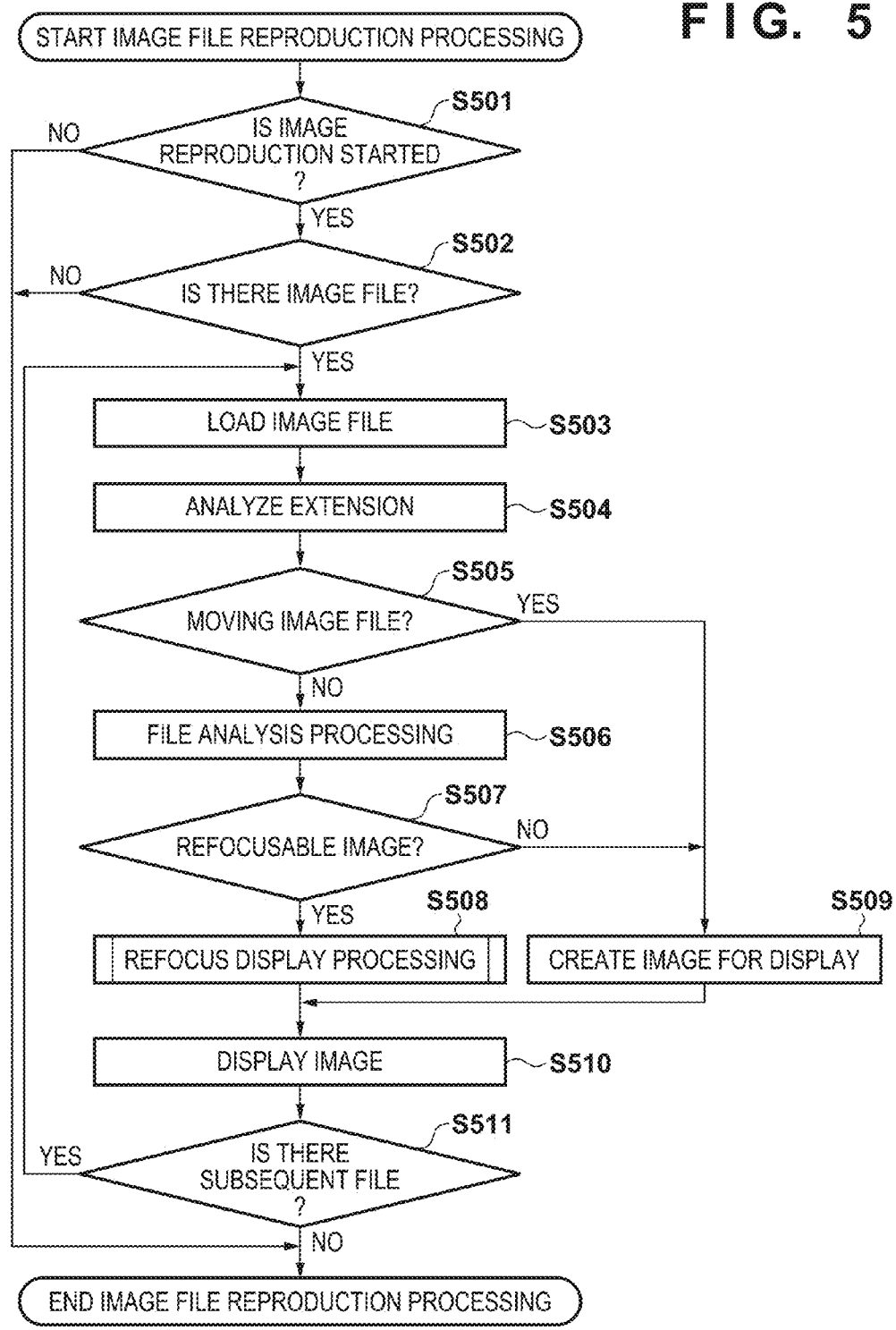
FIG. 5 is a flowchart of processing for reproducing an image file according to a first embodiment.
Figure 6:
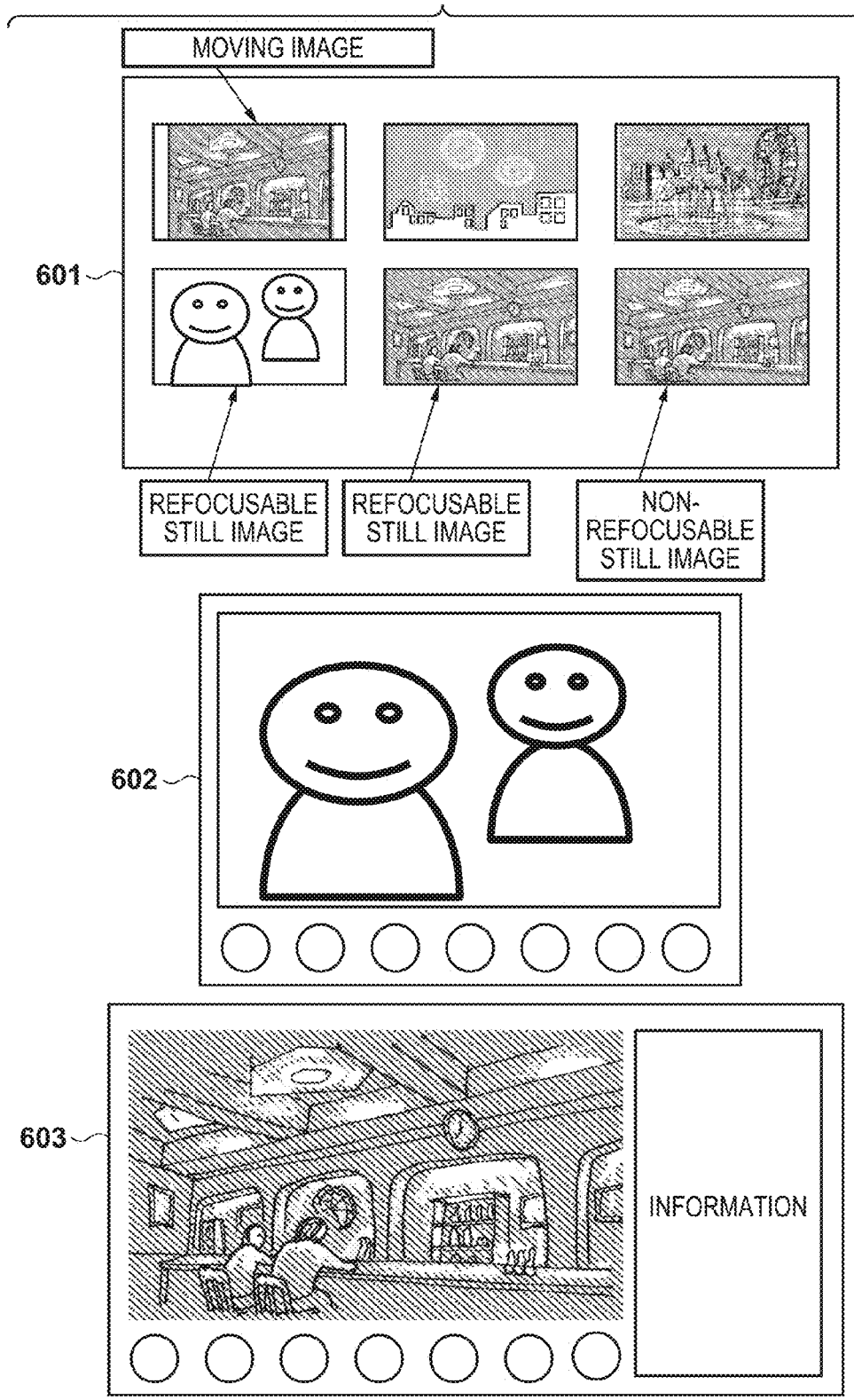
FIG. 6 is a diagram showing a mode for displaying image file data.

Next, the processing for displaying an refocus image in a display mode as shown in FIG. 6 will be described with reference to FIG. 7, which shows the details of step S508 of FIG. 5. First, it is determined in step S701 whether or not an image to be displayed is refocusable image data. In the case where the image is refocusable image data, the processing advances to step S702. If the image is not refocusable image data, the processing ends.

The image file is analyzed in step S702, and a display mode is selected in step S703. In the case where it is determined that the display mode for the analyzed refocusable image data is index display (the case of the display mode 601), the processing advances to step S705, and data is acquired from the composite thumbnail image portion 404 in the image data structure shown in FIG. 4. In the case where it is determined that the display mode is not the index display (the case of display modes 602 and 603), the processing advances to step S704, and data is acquired from the composite JPEG image portion 405.

In step S706, display data creation processing for creating display data from the image data acquired in step S704 or step S705 is performed. This display data creation processing is data creation processing for displaying data decompressed by the compression-decompression circuit 115 on the display unit 116 by the display control circuit 117. Note that processing for displaying the created display data on the display unit 116 is also performed in step S706.

Next, refocus display information stored in the memory unit 108 is acquired in step S707. The refocus display information is information that is displayed to indicate whether or not the image data is refocusable. Next, the refocus display information is displayed together with the image data displayed in step S706 so as to indicate that the image data is refocusable image data. FIG. 8 indicates an example showing the refocus display information together with the image data.

As described above, with the first embodiment, it is possible to show a user that image data is refocusable image data by displaying the composite data of refocusable image data and information indicating that the image data is refocus data stored in a camera.

Note that the case where refocus processing is performed using left eye image data and right eye image data that are obtained from the image capturing element shown in FIG. 2 has been described in the above-described embodiment. However, since the left eye image data and the right eye image data are pieces of data with a disparity therebetween, images having different view points from the left eye to the right eye can be generated using these pieces of data by controlling a compositing ratio for the left eye image data and the right eye image data, for example. Also, it is possible to generate and display a three-dimensional image with a known technique. There are cases where these processes and refocus processing are collectively referred to as reconstruction processing. Therefore, in step S709 of FIG. 7, the information indicating that image data is reconstructable image data may be displayed together with the image data. That is, it can be thought that pieces of image data with successive different view points are sequentially displayed at the time of display, or a 3D image is displayed, for example.

Second Embodiment

Figure 9:
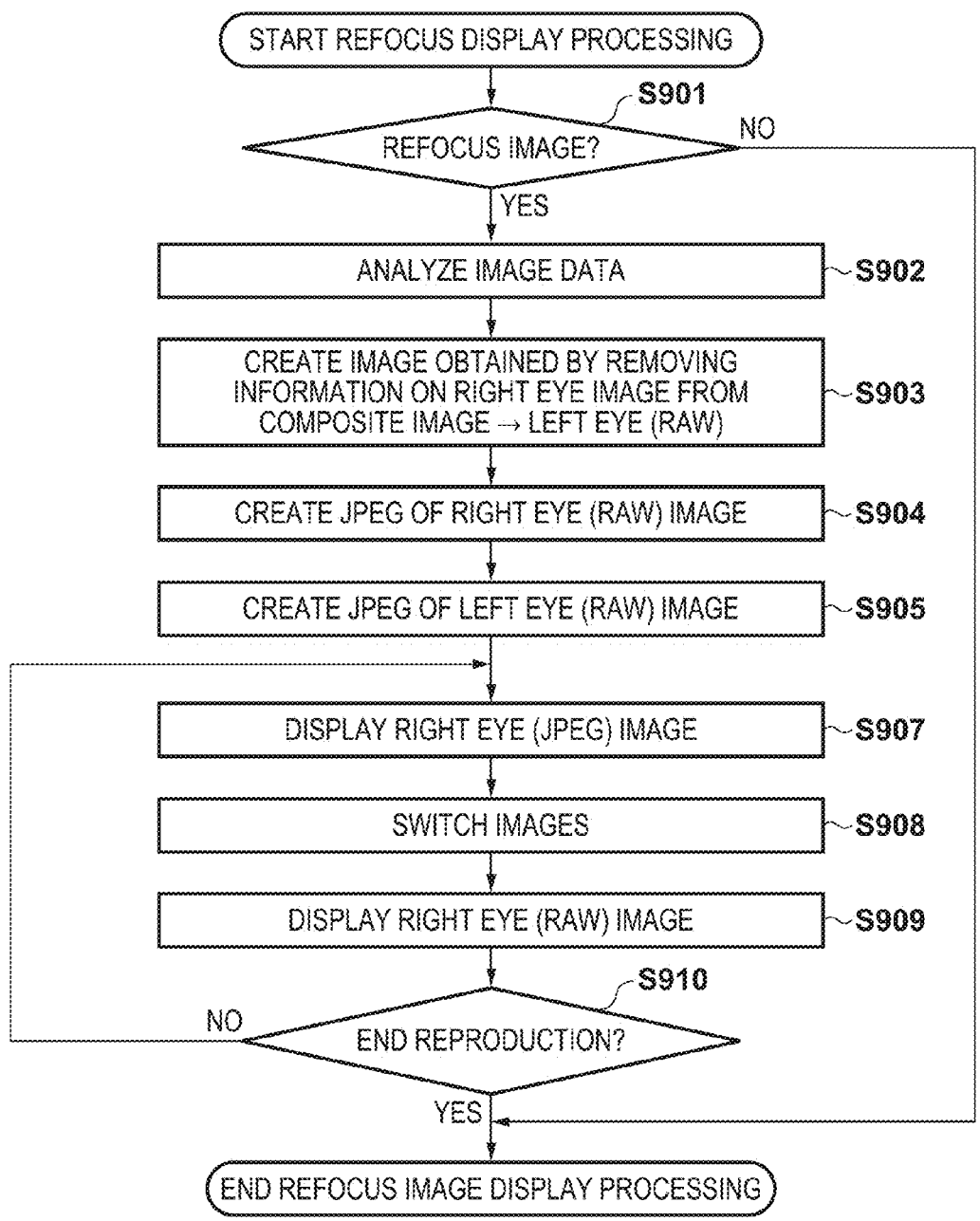
FIG. 9 is a flowchart showing refocus display processing according to a second embodiment.
Figure 10:
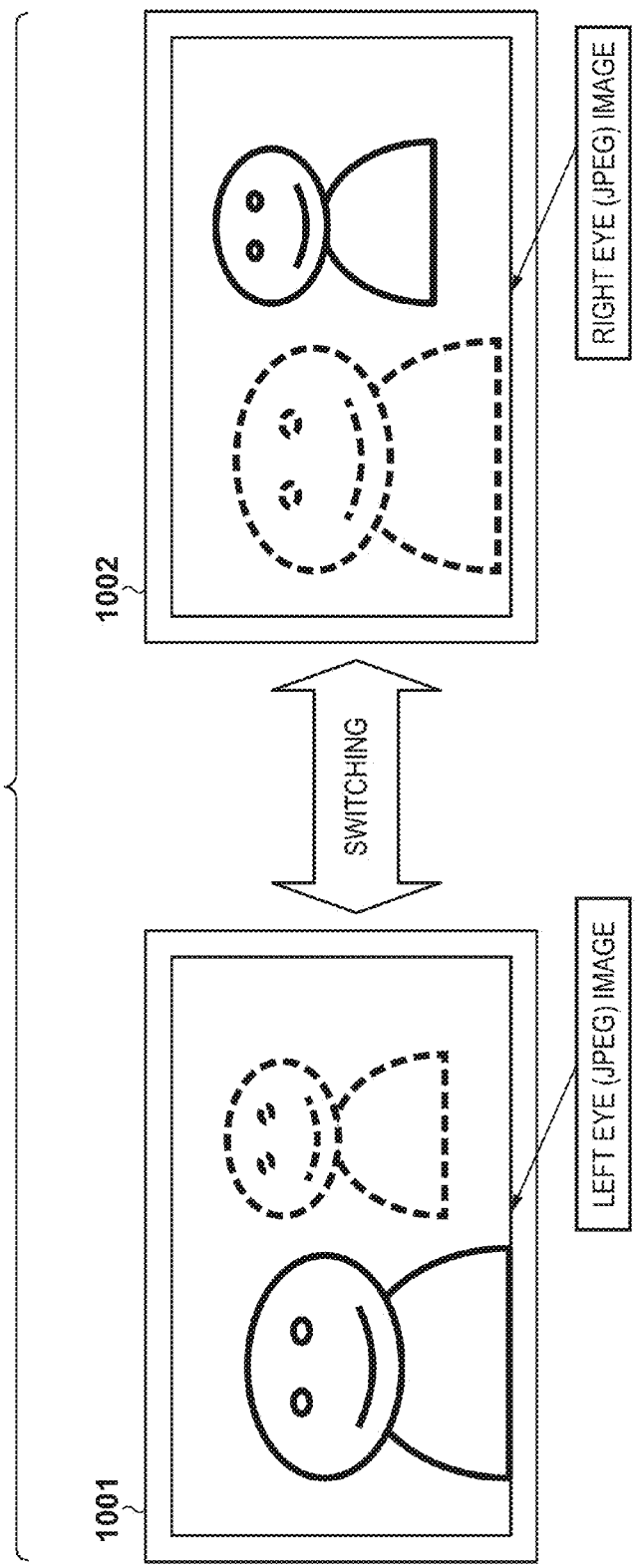
FIG. 10 is a diagram showing a display method according to the second embodiment.

Next, a second embodiment. of refocus display processing performed in step S508 shown in FIG. 5 will be described with reference to FIGS. 9 and 10.

First, it is determined in step S901 whether or not an image to be displayed is refocusable image data. In the case where the image is refocusable image data, the processing advances to step S902. If the image is not refocusable image data, the processing ends.

In step S902, data analysis is performed, and composite RAW image data and right eye RAW image data in the image data structure shown in FIG. 4 are retrieved from the refocusable image data. In step S903, the right eye RAW image data is removed from the composite RAW image data with the image decomposition function of the image compositing circuit 113 so as to generate left eye RAW image data. Next, in steps S904 and S905, right eye JPEG image data and left eye JPEG image data for display are generated from the right eye RAW image data and the left eye RAW image data with the compression-decompression circuit 115.

In a LOOP operation from step S907 to S910, the eye JPEG image and the left eye JPEG image are alternately reproduced on the display unit 116 via the display control circuit 117. Specifically, the right eye image data (reference numeral 1002 in FIG. 10) is displayed on the display unit 116 in step S907. Thereafter, a display switching operation is performed in step S908 upon the elapse of a given time, and the left eye image data (reference numeral 1001 in FIG. 10) is displayed on the display unit 116 in step S909. It is determined in step S910 whether or not continuous reproduction is to end, and in the case where it is determined that the continuous reproduction is to be continued, the processing returns to step S907, the right eye image data is displayed again, and the reproduction is continued. The right eye image data (1002) and the left eye image data (1001) are alternately displayed as shown in FIG. 10 in the modes for displaying refocus images shown in FIG. 6. Accordingly, it is possible to show a user that the displayed data is refocusable image data and to also simultaneously show a subject distance range in which refocusing is possible.

As described above, with the refocus display processing according to the present embodiment, disparity images for both eyes are alternately reproduced by reproducing image data for one eye, whereby it is possible to show a user that the displayed data is refocusable image data. Also, the subject distance range in which refocusing is possible can be displayed simultaneously.

Note that the case where refocus processing is performed using left eye image data and right eye image data that are obtained from the image capturing element shown in FIG. 2 has also been described in the above-described embodiment. However, since the left eye image data and the right eye image data are pieces of data with a disparity therebetween, images having different view points and a three-dimensional image can also be generated using these pieces of data. Therefore, in step S907 to S910 in FIG. 9, the images having different view points and three-dimensional images may be alternately displayed.

Third Embodiment

Figure 11:
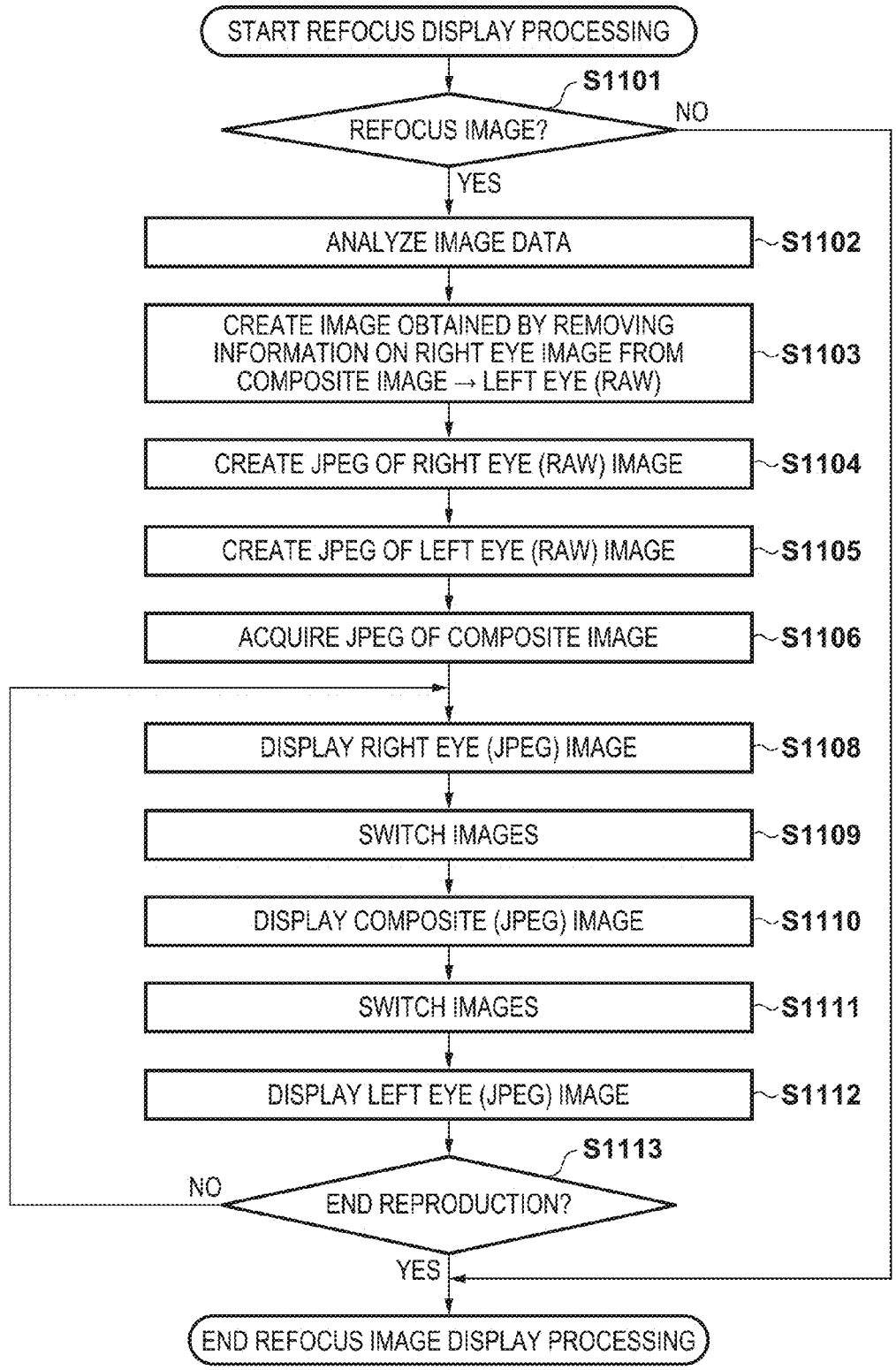
FIG. 11 is a flowchart showing refocus display processing according to a third embodiment.
Figure 12:
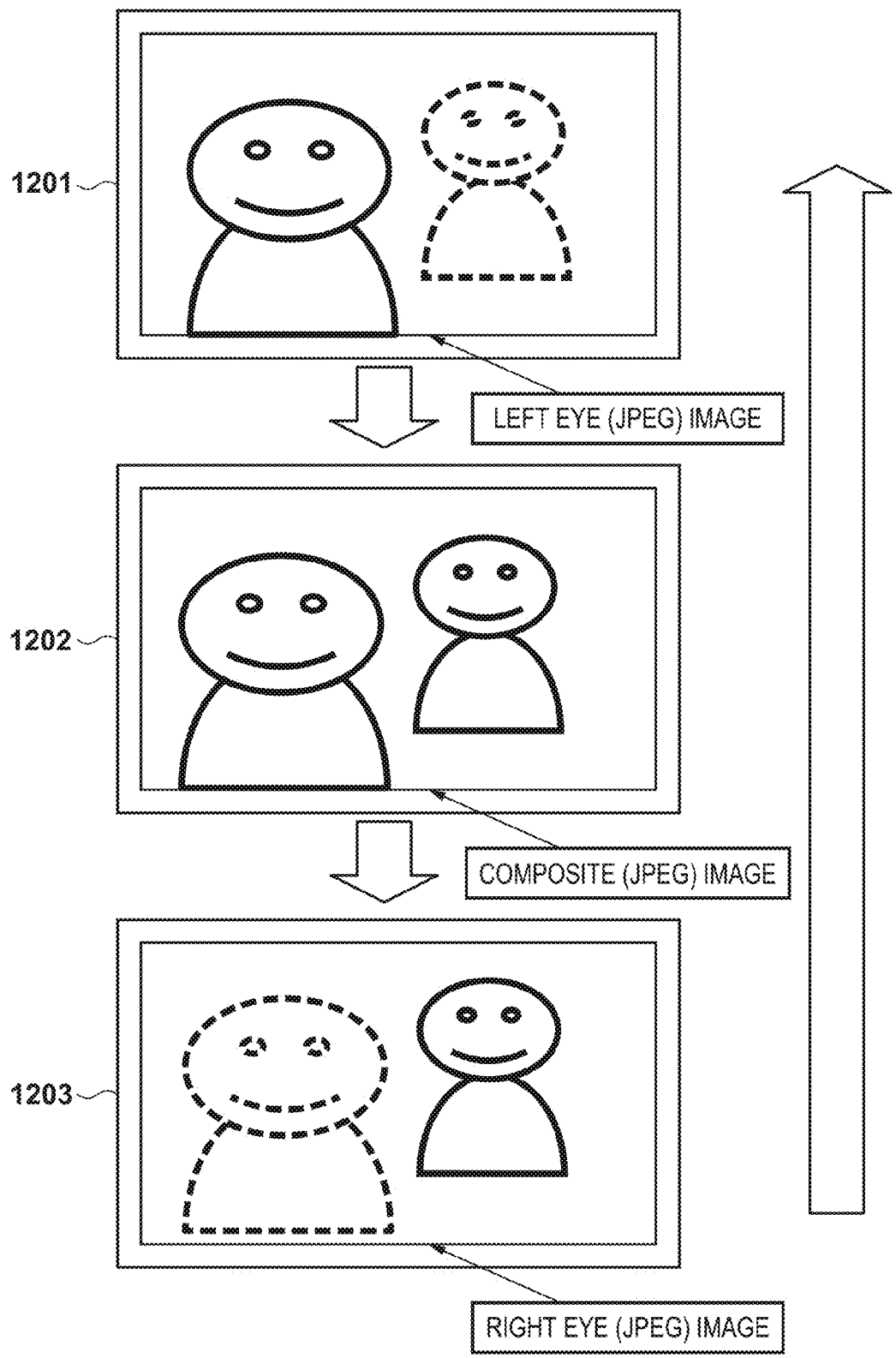
FIG. 12 is a diagram showing a display method according to the third embodiment.

Next, a third embodiment of refocus display processing performed in step S508 shown in FIG. 5 will be described with reference to FIGS. 11 and 12.

First, it is determined in step S1101 whether or not an image to be displayed is refocusable image data. In the case where the image is refocusable image data, the processing advances to step S1102. If the image is not refocusable image data, the processing ends.

In step S1102, data analysis is performed, and composite RAW image data and right eye RAW image data in the image data structure shown in FIG. 4 are retrieved from the refocusable image data. In step S1103, the right eye RAW image data is removed from the composite RAW image data with the image decomposition function of the image compositing circuit 113 so as to generate left eye RAW image data. Next, in steps S1104 and S1105, right eye JPEG image data and left eye JPEG image data for display are generated from the right eye RAW image data and the left eye RAW image data with the compression-decompression circuit 115. In step S1106, composite JPEG image data in the image data structure shown in FIG. 4 is acquired. Accordingly, all data to be displayed is obtained.

In a LOOP operation from steps S1108 to S1113, the right eye JPEG image (reference numeral 1203 in FIG. 12), the composite JPEG image data (reference numeral 1202 in FIG. 12), and the left eye JPEG image data (reference numeral 1201 in FIG. 12) are reproduced on the display unit 116 through display control circuit 117 while being successively switched between. Specifically, the right eye image data is displayed on the display unit 116 in step S1108. Thereafter, a display switching operation is performed in step S1109 upon the elapse of a given time, and the composite image data is displayed on the display unit 116 in step S1110. Furthermore, display switching is performed in step S1111 upon the elapse of a given time, and the left eye image data is displayed on the display unit 116 in step S1112.

It is determined in step S1113 whether or not the continuous reproduction is to end, and in the case where it is determined that the continuous reproduction is to be continued, the processing returns to step S1108, the right eye image data is again displayed, and the reproduction is continued. The right eye image data 1203, the left eye image data 1201, and the composite image data 1202 are alternately displayed as shown in FIG. 12 in the mode for displaying refocus images shown in FIG. 6. Accordingly, it is possible to show a user that the displayed data is refocusable image data and to also simultaneously show a subject distance range in which refocusing is possible.

As described above, with the refocus display processing in the present embodiment, disparity images for both eyes and a composited image are alternately reproduced by alternately reproducing the composite data of refocable image data and each eye image data, thus making it possible to show a user that the displayed data is refocusable image data by alternately reproducing the disparity images for both eyes and the composited image. Also, a subject distance range in which refocusing is possible can be displayed simultaneously.

Note that the case where refocus processing is performed using left eye image data and right eye image data that are obtained from the image capturing element shown in FIG. 2 has been described in the above-described embodiment. However, since the left eye image data and the right eye image data are pieces of data having a disparity therebetween, images having different view points and a three-dimensional image can also be generated using these pieces of data. Thus, in step S1108 to S1113 in FIG. 11, images having different view points or three-dimensional images may be alternately displayed.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-041775, filed Mar. 3, 2015, which is hereby incorporated by reference herein in its entirety.

What is claimed is:

1. An image processing apparatus comprising:
at least one processor or circuit configured to perform the operations of the following units:
an acquisition unit configured to acquire a first image file that includes light field data and a second image file not includes light field data;
a control unit configured to simultaneously display first image data corresponding to light field data included in the first image file and second image data corresponding to image data included in the second file on a display, and
wherein the control unit determines whether the image to be displayed corresponds to light field data or not by analyzing each data in a plurality of image files acquired by the acquisition unit, and performs display for informing a user that the displayed image data corresponds to either the first image data or the second image data.

2. The image processing apparatus according to claim 1, wherein
the light field data that includes the information corresponding to a light field includes a plurality of pieces of image data having different disparities.

3. The image processing apparatus according to claim 1, further comprising:
a generation unit configured to generate a plurality of images having different focus positions from the light field data,
wherein the control unit informs a user that the image file is the first image file by alternately displaying on the display the plurality of images having the different focus positions.

4. The image processing apparatus according to claim 3, wherein
the control unit alternately displays images in which focus is respectively placed on a nearest subject and a farthest subject that can be focused on the light field data.

5. The image processing apparatus according to claim 1, further comprising:
a generation unit configured to generate a plurality of images having different view points from the light field data,
wherein the control unit informs a user that the image file is the first image file by alternately displaying the plurality of image having the different view points.

6. The image processing apparatus according to claim 1, wherein
the first image file includes a plurality of pieces of image data having different disparities and composite image data obtained by compositing the plurality of pieces of image data having the different disparities.

7. The image processing apparatus according to claim 1, wherein
the first image file includes a piece of image data of a plurality of pieces of image data having different disparities and composite image data obtained by compositing the plurality of pieces of image data having the different disparities.

8. The image processing apparatus according to claim 1, further comprising:
a storage unit configured to store the first image files as an image file that can be inversely transformed.

9. The image processing apparatus according to claim 1, wherein
the acquisition unit includes an image capturing element in which unit pixels that each include a plurality of photoelectric converting elements with respect to one microlens are arranged in a matrix.

10. The image processing apparatus according to claim 1, wherein
the control unit displays an image corresponding to the second image data and the first image data different display modes.

11. The image processing apparatus according to claim 1, wherein
the control unit superimposes display information indicating the first image data on the first image data on the display and does not superimpose the display information on the second image data.

12. The image processing apparatus according to claim 1, wherein
the control unit superimposes display information indicating the first image data on the first image data on the display in a case where a plurality of image data corresponding to a plurality of image files stored in a memory are simultaneously displayed, and does not superimpose the display information on the first image data but displays the display information apart from the first image data on the display in a case where one of the plurality of the image data is displayed.

13. The image processing apparatus according to claim 1, wherein the control unit determines whether the image to be displayed corresponds to light field data or not by analyzing a structure of a DCF image file of a plurality of image files acquired by the acquisition unit.

14. The image processing apparatus according to claim 1, wherein the control unit determines whether the image to be displayed corresponds to light field data or not by determining whether predetermined image data is recorded.

15. The image processing apparatus according to claim 1, wherein the first image file includes a plurality of RAW image data.

16. The image processing apparatus according to claim 1, wherein the control unit analyzes an extension and determines whether the image file is moving image data or still image data.

17. An image processing method comprising:
acquiring a first image file that includes light field data and a second image file not includes light field data;
simultaneously displaying first image data corresponding to light field data included in the first image file and second image data corresponding to image data included in the second image file on a display, and
wherein in displaying, whether the image to be displayed corresponds to light field data or not is determined by analyzing each data in a plurality of image files acquired by the acquisition unit, and display for informing a user that the displayed image data corresponds to either the first image data or the second image data is performed.

18. A non-transitory computer readable storage medium storing a program for causing a computer to execute steps of an image display method,
the image processing method comprising:
acquiring a first image file that includes light field data and a second image file not includes light field data;
simultaneously displaying first image data corresponding to light field data included in the first image file and second image data corresponding to image data included in the second image file on a display, and
wherein in displaying, whether the image to be displayed corresponds to light field data or not is determined by analyzing each data in a plurality of image files acquired by the acquisition unit, and display for informing a user that the displayed image data corresponds to either the first image data or the second image data is performed.

* * * * *